3,386,948
POLYMERIC COMPOSITION

Donald G. Needham and George R. Hill, Bartlesville, Okla., assignors to Phillips Petroleum Company, a corporation of Delaware
No Drawing. Filed July 1, 1965, Ser. No. 468,914
2 Claims. (Cl. 260—41)

ABSTRACT OF THE DISCLOSURE

Stabilized polymeric compositions having good weathering properties are provided by blending a solid polymer of 1-olefins, an oxide of zinc, magnesium or calcium or barium sulfate and an ultraviolet stabilizer.

This invention relates to novel stabilized polymeric compositions. In one aspect it relates to ultraviolet stabilized compositions of polymers of 1-olefins. In another aspect it relates to polymer compositions exhibiting improved weathering characteristics.

It is known in the art to prepare solid polymers of 1-olefins. One such process for producing such polymers is disclosed by Hogan and Banks in U.S. Patent 2,825,721. Polymers produced by such a process are extremely well suited for many uses in the art. However, continued exposure to sunlight or other source of ultraviolet light results in some instances in a deterioration of the physical properties of the polymer. Thus, much effort has been devoted to determining agents which can be added to such polymers to stabilize same against the degradation which is induced by exposure to light or other weathering conditions.

It is an object of the present invention to provide a white 1-olefin resin composition which will yield molded or extruded articles having high light stability.

Another object of this invention is to provide a polymeric composition having improved weathering qualities.

Other aspects, objects and the several advantages of the invention will be apparent to those skilled in the art from the description and the appended claims.

In accordance with this invention, we have discovered that incorporation of a compound selected from the group consisting of zinc oxide, magnesium oxide, calcium oxide and barium sulfate into polymers of 1-olefins having 2 to 8 carbon atoms and containing at least one ultraviolet stabilizer results in a white, polymeric composition free from undesirable color development and which exhibits excellent weathering qualities.

The term "ultraviolet stabilizers" as employed herein is intended to include all known ultraviolet stabilizers which are known in the art and which are effective in polymer compositions. Such compounds include 2-hydroxy-4-n-octoxybenzophenone, phenol-nickel complexes, phenyl salicylates, alkyl phenyl salicylates, benzotriazoles, 2,4-dihydroxybenzophenone, 2-hydroxy - 4 - methoxybenzophenone, 2,2',4,4' - tetrahydroxybenzophenone, 2,2'-dihydroxy-4,4'-dimethoxybenzophenone, dibenzoyl resorcinol, dialkylmethylene malononitriles, and the like.

In addition, the composition can also contain other ingredients normally employed to give desirable properties to the resulting polymer. Such ingredients include antistatic agents, antioxidants, crystallization modifiers, lubricants, dispersing agents, fillers, pigments and the like.

Example

The following example is presented to further illustrate the invention.

The following blends of polyethylene containing defined additives were tested under identical conditions. Failure time is taken as the time for elongation to be reduced to 9 percent.

TABLE

| Run | Polymer | Stabilizer | Additive | Time to Failure, hrs. |
|---|---|---|---|---|
| 1 | Polyethylene [1] | 0.5% UV 531 | 2% TiO$_2$ | 900 |
| 2 | Polyethylene [1] | 0.5% UV 531 | 2% ZnO | 3,600 |
| 3 | Polyethylene [1] | 0.5% UV 531 | 4% ZnO | 2,000 |
| 4 | Polyethylene [1] | 0.5% UV 531 | 2% MgO | 1,500 |
| 5 | Polyethylene [1] | 0.5% UV 531 | 2% CaO | 2,000 |
| 6 | Polyethylene [1] | 0.5% UV 531 | 2% BaSO$_4$ | 3,000 |

[1] Ethylene-butene-1 copolymer produced in solution process containing about 5% butene-1 and having a density of 0.95 and a melt index of 1.2.

UV 531 employed herein comprises 2-hydroxy-4-n-octoxy benzophenone and is described by R. J. Martinovich in Plastics Technology, vol. 9, No. 11, November 1963, pages 45–48, particularly page 46.

The above data clearly indicate each of the additives of Runs 2–6 gave a substantial improvement over the composition of Run 1 containing 2 percent conventional titanium oxide additive.

The above samples were tested as follows:

Numerous samples of each run were placed in a Type XW Weather-Ometer. At regular intervals three samples from each run were removed from the Weather-Ometer and pulled on an Instron tensile tester at 20 in./min. When elongation at break (average for three samples) in a typical tensile strength pull reaches 9 percent, this point is taken as failure time. This failure time is generally obtained by interpolation between the number of hours in the Weather-Ometer at which the elongation at break is still above 9 percent and the number of hours at which it first falls below 9 percent. The Tensile Test is ASTM D–638–61T. The Weather-Ometer Test itself is ASTM D–1499–59T.

Reasonable variations and modifications are possible within the scope of this disclosure without departing from the spirit and scope of the invention.

We claim:

1. A composition comprising (1) an ethylene-butene-1 copolymer and stabilizing amounts of (2) 2-hydroxy-4-n-octoxy benzophenone and (3) barium sulfate.

2. A composition according to claim 1 wherein said ethylene butene-1-copolymer is produced in a solution process and contains about 5 percent butene-1 and the composition contains 2 percent barium sulfate.

References Cited

UNITED STATES PATENTS

| 2,993,799 | 7/1961 | Blake | 260—41 |
| 3,188,298 | 6/1965 | Williamson et al. | 260—45.85 |
| 3,238,163 | 3/1966 | O'Neil et al. | 260—41 |
| 3,278,483 | 11/1966 | Wright et al. | 260—45.85 |

DONALD E. CZAJA, *Primary Examiner.*

HOSEA E. TAYLOR, Jr., *Examiner.*